Aug. 29, 1961  L. L. JONES  2,997,989
LIQUID LEVEL CONTROL FOR BOILERS
Filed May 31, 1956
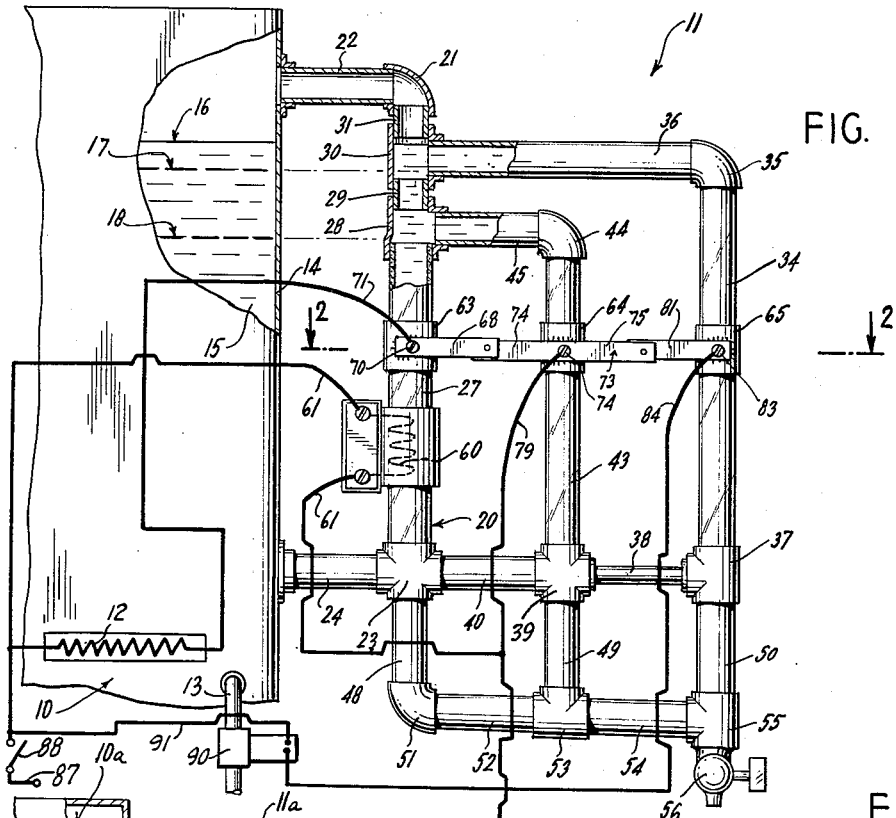
FIG. 1.
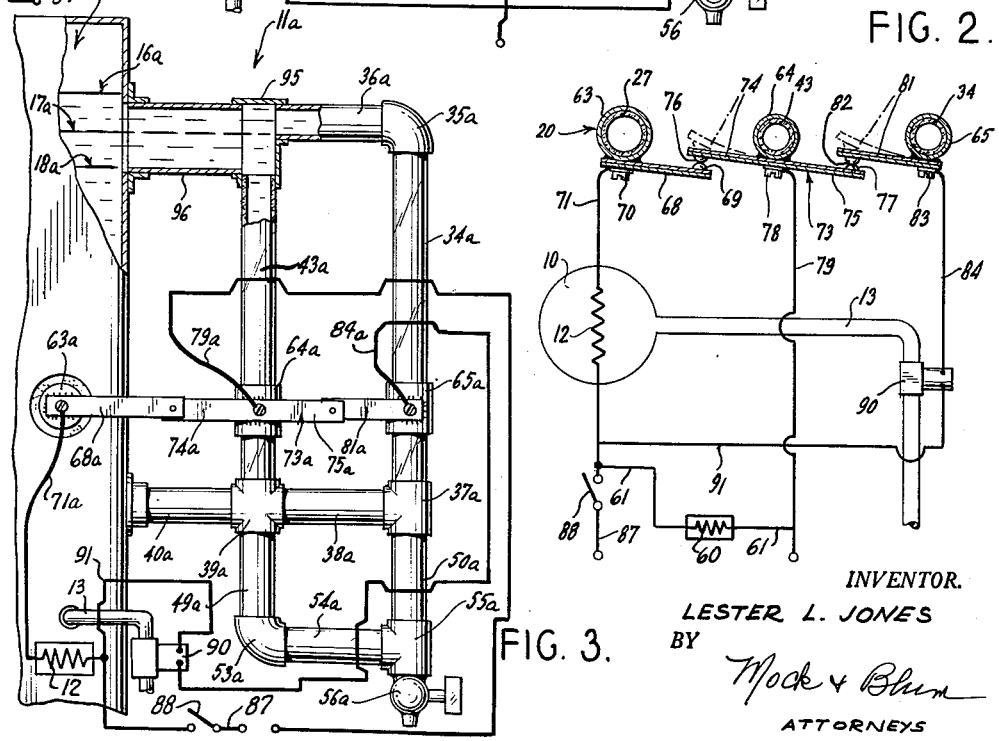
FIG. 2.
FIG. 3.
INVENTOR.
LESTER L. JONES
BY Mock & Blum
ATTORNEYS

United States Patent Office
2,997,989
Patented Aug. 29, 1961

2,997,989
LIQUID LEVEL CONTROL FOR BOILERS
Lester L. Jones, Oradell, N.J., assignor to Automatic Steam Products Corp., New York, N.Y., a corporation of New York
Filed May 31, 1956, Ser. No. 588,463
3 Claims. (Cl. 122—451.1)

This invention relates generally to apparatus for sensing or indicating the level of liquid in a vessel, and embraces novel and improved liquid level control means for use with a boiler vessel.

The particular embodiments of the present invention, which are illustrated in the drawings and which will be described hereinafter in greater detail, comprise generally a conduit having its upper and lower ends adapted for connection in fluid communication with a liquid containing body, with the upper conduit end at a desired minimum lquid level so that a convection current path is formed of liquid heated in the body to move upward therein and downward in the conduit when the liquid level is at or above the minimum. Temperature responsive means is connected to the conduit for sensing a decrease in the temperature of liquid in the conduit when the liquid level falls below the minimum and causes the convection current to stop flowing.

It is a general object of the present invention to provide a device of the type described for sensing and/or controlling the level of liquid in a vessel, which device is simple, sturdy and economical in construction, and capable of being employed in conjunction with a wide variety of vessels, either as original equipment or as an attachment for existing vessels.

It is another object of the present invention to provide a liquid level control device which can be located entirely exteriorly of a liquid containing vessel for convenience in installation and maintenance, and which contains relatively few moving parts for reliable and trouble-free operation over long and continuous periods of use.

It is still another object of the present invention to provide a device for sensing and/or controlling the level of liquid in a vessel, which device has the advantageous characteristics mentioned in the foregoing paragraphs and can be manufactured, installed, operated and maintained at extremely reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is an elevational view, partly in section, showing a liquid level control device of the present invention in operative association with a boiler vessel or tank;

FIGURE 2 is a sectional view, taken substantially along the line 2—2 of FIGURE 1, and schematically illustrates the electrical system of the device of FIGURE 1; and FIGURE 3 is an elevational view, partly in section, showing a slightly modified liquid level control device of the present invention in operative assembly with a boiler vessel.

Referring now more particularly to the drawings, and specifically to FIGURES 1 and 2 thereof, there is illustrated therein a liquid containing hollow body or vessel, such as a boiler tank, generally designated 10, and a control device generally designated 11, arranged exteriorly of and connected to the vessel.

The vessel 10 may be of any type suitable for containing liquid, such as that of a water or steam boiler, and is shown in FIG. 2 as being provided with an internal heating element 12 and a liquid inlet supply line or pipe 13. As seen in FIG. 1, the vessel 10 includes a generally upstanding side wall 14, which is broken away to show a liquid 15 contained in the vessel.

The control device 11 is arranged entirely exteriorly of the vessel 10 and includes an upstanding hollow, substantially vertically disposed, generally hollow body or tube 20 connected at its upper end by an elbow 21 and a substantially horizontal nipple 22 with the vessel wall 14 for communication with an upper interior region of the vessel, above the normal level of liquid 15 indicated by arrow head 16. The lower end of the tubular body 20 is connected by a four-way pipe joint or fitting 23 and a substantially horizontal nipple 24 with the vessel wall 14 at a point spaced considerably below the upper end connection of the body for fluid communication with the interior of the vessel. More particularly, the tubular body 20 includes a lower, main tube or section 27, preferably of metal for maximum conduction of heat, having its lower end connected to the joint 23. A lower T-joint 28 is connected to the upper end of the main tube section 27, an intermediate tube section 29 being connected to the upper end of the lower T-joint, an upper T-joint being connected to the upper end of the intermediate tube section 29; and an upper tube section 31 is connected between the upper T-joint 30 and elbow 21. The T-joint 30 is located in the vertical tubular body 20 with the lower region of its side opening at the desired minimum level of liquid 15, as indicated by arrowhead 17, while the T-joint 28 is located in the tubular body with the lower region of its side opening at a danger level of the liquid, as indicated by arrowhead 18, below the desired minimum liquid level.

An upright or generally vertically disposed conduit or pipe 34, preferably of glass or other ceramic material, is arranged in side by side relation with the tubular body 20, having its upper end connected by an elbow 35 and a generally horizontal nipple or pipe 36 with side opening of upper T-joint 30. The lower end of the conduit 34 is connected by a T-joint 37, generally horizontal nipple 38, four-way joint 39, and a generally horizontal nipple 40 with the four-way joint 23. An additional upright, generally vertically disposed tubular member or conduit 43, also preferably of glass or other insulating material, is arranged adjacent the tubular body 20 and conduit 34, having its upper end connected by an elbow 44 and a generally horizontal nipple 45 with the side opening of lower T-joint 28, and having its lower end connected to the four-way joint 39.

Connected to and depending from the joints 23, 39 and 37, respectively, are nipples or short lengths of pipe 48, 49 and 50. The lower ends of the nipples or pipes 48, 49 and 50 are connected by elbow 51, inclined pipe 52, T-joint 53, inclined pipe 54, and T-joint 55 with a pet cock or drain valve 56.

Attached to the main tube section 27 of the tubular body 20 in the lower region thereof, is a heater 60 of any suitable construction for heating liquid in the lower region of the tubular body. In the illustrated embodiment, the heater 60 is electrically operated and provided with electric wires 61, 61, but other heating means may also be employed.

A heat receiving element or collector 63 is mounted on the tubular body 20 and arranged in heat receiving relation with respect to the liquid contents of the body, being located above the heater 60 and spaced appreciably below the T-joints 28 and 30. As illustrated, the heat collector 63 may comprise an annular member or collar fabricated of high conductivity material and snugly circumposed about the main tube section 27.

Similar heat collectors or collars 64 and 65 are circumposed about the conduits 43 and 34, respectively, at substantially the same level as the collar 63, and in heat receiving relation with the liquids contained in the respective conduits.

Secured to the heat collector 63, as by welding or other suitable means, is one end of a generally horizontally disposed bimetallic contact strip or arm 68. The contact strip 68 has its free end extending generally toward, but terminating short of the adjacent conduit 43, and is there provided with a contact point 69. Adjacent to the fixed end of the contact arm 68 is provided a terminal post or fastener 70 for connecting an electrical conductor 71 to the arm. A generally horizontally extending bimetallic strip 73 is welded or otherwise secured intermediate its ends to the collector 64 of the conduit 43, and extends laterally outwards in opposite directions, toward the tubular body 20 and conduit 34, defining a switch arm 74 and a contact arm 75, respectively. The free end portion of the switch arm 74 is provided with a contact point 76 located for engagement with the contact point 69 of the contact arm 68, and the free end portion of the contact arm 75 is provided with a similar contact point 77. Centrally of the bimetallic strip 73 is located a terminal post or fastener 78 for electrically connecting the conductor 79 to the strip. An additional bimetallic strip or switch arm 81 has one end secured by welding or other suitable means to the collector collar 65 and extends laterally therefrom toward but terminating short of the collector collar 64. A contact point 82 is secured on the free end portion of the switch arm 81 for engagement with the contact point 77 of the contact arm 75; and, a terminal post 83 is provided on the fixed end portion of the switch arm 81 for electrically connecting a conductor 84 to the latter switch arm.

As seen in FIGURE 2, the conductor 71 is connected through the boiler heater 12 with a supply line 87 having interposed therein an on-off switch 88. The conductor 79 is connected to a source of electrical supply and combines with the line 87 and conductor 71 to supply current to the boiler heater 12 when the on-off switch 88 is closed and the contact points 76 and 69 of the switch arm 74 and contact element 68 are in engagement with each other.

The conductor 84 from the switch arm 81 is connected to a solenoid valve 90 in the liquid supply conduit 13, which valve is in turn connected by a conductor 91 to the supply line 87. Hence, a closed electrical circuit is defined through the line 87, conductor 91, valve 90, and conductor 79, when the on-off switch is closed and the contact points 82 and 77 of the switch arm 81 and contact element 75 are in engagement with each other. When said electrical circuit is closed, solenoid valve 90 is closed. Upon movement of the switch arm 81 to its dot-and-dash line position away from the contact arm 75, the circuit through the solenoid valve will be opened and effect opening of the valve; and, upon movement of the switch arm 74 to its dot-and-dash outline position away from the contact arm 68, the circuit through the boiler heater 12 will be opened and the heater cut off.

In operation, the vessel 10 is filled with water or other desired liquid to approximately the desired normal level, as indicated by the arrowhead 16, which serves to fill the control device 11 to substantially the same level. That is, the control device 11 normally contains liquid at a level sufficient to fill the interior of upper nipple or pipe 36, as illustrated. It is desirable that the nipples or pipes 36 and 45 be horizontal or inclined slightly upwards toward the vessel 10 in order to avoid trapping air or vapor which would prevent circulation, as will appear presently.

The heater 60 is energized to heat liquid contained in the lower region of the tubular body 20, whereupon the heated liquid will rise and impart heat through the tube 27 to the heat collector 63. Upon continued operation of the heater 60, convection currents will be produced wherein the liquid heated in body 20 will flow upwards therethrough laterally through the pipes 36 and 45, downwards through the conduits 34 and 43, and return through the pipes 38 and 40 to the lower end of the tubular body 20. Thus, two convection current paths or circuits of the contained liquid are produced in the control device. The tubes and pipes defining the paths of convection currents are preferably provided with liberal internal diameters for rapid circulation; and the tubular body 20 is of relatively large internal diameter to afford ample supply of hot liquid for both the conduits 34 and 43, while the return conduit 38 leading from the conduit 34 may have a relatively small internal diameter to reduce the rate of flow through the latter conduit. That is, as the heated liquid in body 20 tends to continue rising past the upper end of the conduit 43 and enter through the pipe 36 into the upper end of the conduit 34, the constriction provided by return pipe 38 serves to properly proportion the flow of heated liquid from the tubular body 20 to the conduits 34 and 43.

In normal operation, the heat collector 63 is maintained at an elevated temperature corresponding to the temperature of the heated liquid in the tubular body 20, while the heat collectors 64 and 65 are also maintained at elevated temperatures corresponding to the elevated temperatures of the previously heated liquid passing by connection through the conduits 43 and 34, respectively. That is, the hereinbefore described convection currents serve to transfer heated liquid from the tubular body 20 to the conduits 43 and 34, while the heater 60 provides additional heated liquid in the tubular body, so that a temperature differential exists between the heated liquid in tubular body 20 and the liquids in conduits 43 and 34, which differentials may be approximately constant or are functions of the particular heat transfer characteristics of the specific construction. However, if the elevated temperature of the heated liquid in tubular body 23 increases or decreases, say by the influence of temperature variations of the liquid 15 in vessel 10, the temperatures of liquids in conduits 43 and 34 will correspondingly increase or decrease so that the temperature differentials between the collars 63 and the collars 64 and 65 may remain approximately constant.

In order to insure that the switch arms 74 and 81 remain in electrical contact with the contact arms 68 and 75 regardless of absolute liquid temperatures, the contact and switch arms are each constructed to compensate for thermal deflection of the other and maintain closed connections when the convection currents are flowing through the conduits 43 and 34. That is, if the absolute temperatures of the liquids in tubular body 20 and conduits 43 and 34 are all increased, say by elevation of the temperature of liquid 15 in the vessel 10, the bimetallic contact and switch arms 68, 74, 75 and 81 will all deflect downwards, as seen in FIG. 2, and maintain the electrical connections therebetween in closed condition. Upon lowering of the absolute liquid temperatures in the system, the contact and switch arms will all deflect upwards, and also maintain the electrical connections closed.

Thus, under normal operating conditions the switches defined by the bimetallic strips 68, 73 and 81 are closed, to energize the boiler heater 12 and maintain the liquid supply valve 90 closed.

However, if for any reason the level of liquid 15 in the vessel 10 falls to or below the minimum allowable or desired liquid level 17, little or no water will be present in the pipe 36, so that there will be no convection current of heated liquid passing downward through the conduit 34. The liquid in conduit 34 will therefore rapidly cool, as will the collector 65 and switch arm 81. This decrease in temperature of the liquid in conduit 34 and resultant decrease in temperature of the collector 65 and switch arm 81 serves to deflect the latter to its dot-and-dash line position in FIG. 2 out of engagement with the contact arm 75. Thus, the differential temperature actuating device or switch defined by the bimetallic strips 81 and 73 is opened, and the normally closed solenoid valve 90 is thereby actuated to its open condition for refining the vessel 10. As the liquid level in the vessel 10 is restored to normal, at 16, convection currents will resume from the tubular body 20, through the pipe 36 and conduit 34 to heat the collector 65 and switch arm 81, and return the latter to its solid line, closed condition. The inlet supply valve is thereby closed and the control device again in normal operation, as desicrebd hereinbefore.

If, for some reason, the level of liquid 15 does not return to normal after falling to the refill level of arrowhead 17, but falls further to the level of arrowhead 18, there will be little or no liquid in the upper end nipple 45 of the conduit 43. Hence, there will be no convection current of heated liquid passing through the conduit 43, and the liquid in the latter conduit will therefore decrease in temperature and cause the collector 64 and switch arm 74 to decrease in temperature, whereupon the latter switch arm deflects to its dot-and-dash line position of FIG. 2 out of engagement with the contact arm 68. The differential, thermally responsive actuating switch defined by the switch arm 74 and contact arm 68 is thus opened to interrupt operation of and deenergize the boiler heater 12. This, of course, prevents excessive heating of liquid in the vessel when the liquid level is dangerously low. Upon return of the liquid 15 to slightly above the level of arrowhead 18, a convection current of liquid will commence to flow upward through the tubular body 20 and downward through the conduit 43, to heat the collector 64 and switch arm 74 and return the latter into its closing engagement with the contact arm 68. The boiler heater 12 is thereby re-energized for heating the liquid 15.

In normal operation, as convection currents circulate through the tubular body 20 and conduits 43 and 34, any sediment present in the liquid will settle through the nipples 48, 49 and 50, and may be occasionally removed by opening the drain valve 56.

In FIG. 3 is shown a slightly modified form of liquid level control 11a, wherein the heater 60 and tubular body 20 of FIG. 1 are eliminated, and the hollow body or boiler vessel 10a functions as the heater and tubular body of FIG. 1 to produce convection currents of liquid.

More particularly, an upright, generally vertically disposed conduit 43a, corresponding to the conduit 43 of FIG. 1, is arranged exteriorly of the vessel or body 10a and has its lower end connected by a four-way joint 39a and generally horizontal nipple or pipe 40 with the interior of the vessel body 10a at a level considerably spaced below the normal liquid level 16a in the vessel. The upper end of the conduit 43a is connected by a T-joint 95 and through a relatively large bore nipple 96 to the interior of the vessel body 10a slightly below the normal vessel liquid level 16a.

An upright, generally vertically disposed conduit 34a, corresponding to the conduit 34 of FIG. 1, is arranged along side of the conduit 43a and has its upper end connected by an elbow 35a and a generally horizontal nipple 36a to the T-joint 95. The lower end of the conduit 34a is connected by a T-joint 37a and generally horizontal pipe or nipple 38a to the four-way joint 39a.

It will be noted that the upper end of conduit 34a terminates at the desired or allowable minimum level of liquid in the body 10a designated by arrowhead 17a, while the upper end of the conduit 43a terminates at a lower, danger level designated by arrowhead 18a. Further, the lower region of the nipple 36a is substantially level with the arrowhead 17a, and the lower region of the nipple 96 is substantially level with the arrowhead 18a.

Sediment drain pipes 49a and 50a depend from the joints 39a and 37a, respectively, and are connected by an elbow 53a, a slightly inclined nipple 54a, and a T-joint 55a to a pet cock or drain valve 56a.

A heat collector or "hot spot" 63a is attached to the wall or boiler vessel or body 10a at an elevation appreciably spaced below the upper end of conduit 43a; and, annular heat collectors or collars 64a and 65a are attached to the conduits 43a and 34a, respectively, at substantially the same level as a collector 63a so as to be spaced appreciably below the upper ends of the respective conduits in heat receiving relation with respect to the liquid in the conduits.

Secured to the heat collectors 63a, 64a and 65a, respectively, are bimetallic strips 68a, 73a and 81a, which correspond in structure and in function to the bimetallic strips 68, 73 and 81. Electric conductors 71a, 79a and 84a are each connected at one end to a respective bimetallic strip, and connected at their other ends in an electrical circuit such as that shown in FIG. 2.

The liquid level control 11a of FIG. 3 operates in a manner similar to that described hereinbefore in connection with FIG. 1. When the hollow body or vessel 10a contains liquid at its normal level 16a the system of the control device 11a is full of the contained liquid, and heated liquid from the vessel or body 10a will pass by convection upwards in the body through the nipples or pipes 96 or 36a, downwards through the conduits 43a and 34a, and return to the vessel through pipes 38a and 40a. The liquid passing through the conduits 43a and 34a is heated and serves to heat the collector rings 64a and 65a to maintain the switch arms 74a and 81a in their closed, engaging relation with the contact arms 68a and 75a. In this condition, the boiler heater will be operating, and the liquid supply valve will be closed.

When the level of liquid in the vessel or body 10a falls to 17a there will be little or no liquid in the nipple 36a and convection of liquid through the conduit 34a will cease. The liquid in the conduit 34a will decrease in temperature, as will the collector 65a and switch arm 81a, serving to deflect the latter out of engagement with contact arm 75a and opening the liquid supply valve to restore the level of liquid in the vessel or body 10a to its normal level 16a.

If for some reason the liquid level is not restored upon decrease below 17a, but falls further to the danger level of 18a, there will remain little or no liquid in the nipple 96 and convection current through the conduit 43a will cease. The liquid contained in conduit 43a will then decrease in temperature, serving to decrease the temperature of collector 64a and switch arm 74a, which moves the latter out of engagement with its contact arm 68a and serves to de-energize the boiler heater, in the same manner as described hereinbefore in connection with FIGS. 1 and 2.

From the foregoing, it is seen that the present invention provides apparatus for sensing and/or controlling the level of liquid in a vessel which fully accomplishes its intended objects, and is well adapted to meet practical conditions of manufacture, installation and use.

Although the present invention has been described in some detail by way of illustration and example for purposes of clarity of understanding, it is understood that certain changes and modifications may be made within the spirit of the invention and scope of the appended claims.

What is claimed is:

1. In combination, liquid storage means having an inlet supply line for flow of liquid into said liquid storage means and control means for permitting flow of liquid through said supply line into said liquid storage means when the liquid level in said liquid storage means falls below a desired minimum level, said control means comprising liquid receiving means which are at least a part of said liquid storage means and which are adapted to hold said liquid at the level of said liquid storage means, means for heating the liquid in said liquid receiving means, a generally vertical conduit, a generally horizontal pipe connecting the upper end of said conduit to said liquid receiving means just above the desired minimum liquid level, the lower end of said conduit being connected to said liquid receiving means appreciably below said minimum liquid level, first thermally responsive means coupled to said liquid receiving means and responsive to the temperature of the liquid therein, second thermally responsive means coupled to said conduit and responsive to the temperature of the liquid therein, a normally closed valve in said inlet supply line, electro-mechanical means operatively coupled to said valve for opening and closing said valve and including switch means, means operatively coupling said switch means to said first and second thermally responsive means, the condition of said switch means corresponding to the respective conditions of said first and second thermally responsive means in response to the temperature differential of the liquid in said liquid receiving means and in said conduit when said horizontal pipe contains water being such as to maintain said electro-mechanical means in valve closing condition, the condition of said switch means corresponding to the respective conditions of said first and second thermally responsive means in response to the temperature differential of the liquid in said liquid receiving means and in said conduit when said horizontal pipe is substantially free of water as the result of the fall of the liquid level in said liquid storage means below its desired minimum level being such as to maintain said electro-mechanical means in valve opening condition.

2. In combination, liquid storage means including a vessel having an inlet supply line for flow of liquid into said vessel, and control means for permitting flow of liquid through said supply line into said vessel when the liquid level in said vessel falls below a desired minimum level, said control means including a tube external to said vessel, the ends of said tube being connected to said vessel respectively above and appreciably below said desired minimum liquid level, said liquid storage means thereby including said tube as a part thereof, means for heating the liquid in said tube, a generally vertical conduit, a generally horizontal pipe connecting the upper end of said conduit to said tube just above the desired minimum liquid level, the lower end of said conduit being connected to said tube appreciably below said minimum liquid level, first thermally responsive means coupled to said tube and responsive to the temperature of the liquid therein, second thermally responsive means coupled to said conduit and responsive to the temperature of the liquid therein, a normally closed valve in said inlet supply line, electro-mechanical means operatively coupled to said valve for opening and closing said valve and including switch means, means operatively coupling said switch means to said first and second thermally responsive means, the condition of said switch means corresponding to the respective conditions of said first and second thermally responsive means in response to the temperature differential of the liquid in said tube and in said conduit when said horizontal pipe contains water being such as to maintain said electro-mechanical means in valve closing condition, the condition of said switch means corresponding to the respective conditions of said first and second thermally responsive means in response to the temperature differential of the liquid in said tube and in said conduit when said horizontal pipe is substantially free of water as the result of the fall of the liquid level in said liquid storage means below its desired minimum level being such as to maintain said electro-mechanical means in valve opening condition.

3. A combination in accordance with claim 1, said liquid storage means being a vessel, said liquid receiving means also being said vessel, said first thermally responsive means being mounted on the wall of said vessel.

References Cited in the file of this patent

UNITED STATES PATENTS

| | | |
|---|---|---|
| 978,983 | Brent | Dec. 20, 1910 |
| 1,099,136 | Van Oosterwych | June 2, 1914 |
| 1,887,147 | De Baufre | Nov. 8, 1932 |
| 2,461,389 | Mitchell | Feb. 8, 1949 |
| 2,495,086 | Anderson | Jan. 17, 1950 |